(12) United States Patent
Rosenberg et al.

(10) Patent No.: US 8,045,959 B1
(45) Date of Patent: Oct. 25, 2011

(54) ASSIGNING A SERVING-CSCF DURING ACCESS AUTHENTICATION

(75) Inventors: Jonathan D. Rosenberg, Freehold, NJ (US); Timothy P. Stammers, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 149 days.

(21) Appl. No.: 11/715,074

(22) Filed: Mar. 6, 2007

Related U.S. Application Data

(60) Provisional application No. 60/780,176, filed on Mar. 6, 2006.

(51) Int. Cl.
*H04W 4/00* (2009.01)

(52) U.S. Cl. ........ 455/411; 455/433; 709/227; 709/230; 370/328; 370/432

(58) Field of Classification Search ............... 455/435.1, 455/411, 433; 370/328, 432; 709/227, 230
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |

(Continued)

FOREIGN PATENT DOCUMENTS

WO WO 98/26381 12/1997

(Continued)

OTHER PUBLICATIONS

Draft—TR45—PN-3-4732-RV4 (to be published as TIA-835.1-D), 32 pages.

(Continued)

*Primary Examiner* — Pierre-Louis Desir
(74) *Attorney, Agent, or Firm* — Baker Botts L.L.P.

(57) ABSTRACT

Assigning a serving-call session control function (serving-CSCF) to an access terminal includes receiving an access authorization request corresponding to the access terminal. The access terminal is authorized, and a serving-CSCF is assigned to the access terminal. An access authorization response comprising the serving-CSCF address is sent.

25 Claims, 2 Drawing Sheets

U.S. PATENT DOCUMENTS

| | | | |
|---|---|---|---|
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 * | 4/2006 | Roach et al. | 719/328 |
| 7,039,027 B2 | 5/2006 | Bridgelall | 370/329 |
| 7,054,268 B1 | 5/2006 | Paranteinen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et al. | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Rosemarijn Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 * | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1 | 6/2004 | Jiang et al. | 370/328 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 * | 8/2005 | Gabor et al. | 455/435.1 |
| 2005/0195766 A1 | 9/2005 | Nasieiski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 * | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 * | 1/2006 | Mutikainen et al. | 370/328 |
| 2006/0046714 A1 * | 3/2006 | Kalavade | 455/428 |
| 2006/0077924 A1 | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0171310 A1 | 8/2006 | Ahluwalia et al. | 370/229 |
| 2006/0251038 A1 | 11/2006 | Tamura et al. | 370/342 |
| 2006/0264207 A1 | 11/2006 | Tamura et al. | 455/415 |
| 2006/0268819 A1 | 11/2006 | Chen et al. | 370/349 |
| 2007/0008882 A1 | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1 | 4/2007 | Gibbs et al. | 726/3 |
| 2007/0121615 A1 | 5/2007 | Weill et al. | 370/389 |
| 2007/0121642 A1 | 5/2007 | Battin et al. | 370/395.2 |
| 2007/0153720 A1 | 7/2007 | Baglin et al. | 370/328 |
| 2007/0254661 A1 | 11/2007 | Chowdhury et al. | 455/436 |
| 2008/0160995 A1 * | 7/2008 | Thiebaut et al. | 455/433 |
| 2009/0089435 A1 * | 4/2009 | Terrill et al. | 709/227 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Draft—TR45—PN-3-4732-RV4 (to be published as TIA-835.2-D), 93 pages.

Draft—TR45—PN-3-4732-RV4 (to be published as TIA-835.3-D), 36 pages.

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps drawings, filed May 19, 2006.

Yegani et al., "System and Method for Handover of an Access Terminal in a Communication Network," U.S. Appl. No. 11/682,735, 24 pps, 3 pps drawings, filed Mar. 6, 2007.

Yegani et al., "Enforcement of User Level Policies from Visited Networks in a Mobile IP Environment," U.S. Appl. No. 11/682,817, 22 pps, 2 pps drawings, filed Mar. 6, 2007.

Yegani et al, Authentication of Access Terminals in a Cellular Communication Network,: U.S. Appl. No. 11/682,857, 28 pps, 5 pps drawings, filed Mar. 6, 2007.

Andreasen et al., "System and Method of Consolidating Accounting Data for a Communication Session," U.S. Appl. No. 11/714,974, 40 pps, 3 pps drawings, filed Mar. 6, 2007.

Panda et al., "System and Method for Capturing Accounting Data for a Communication Session," U.S. Appl. No. 11/715,018, filed Mar. 6, 2007.

Rosenberg et al., "System and Method for Determining a Network for Processing Applications for a Communication Session," U.S. Appl. No. 11/715,019, 40 pps, 3 pps drawings, filed Mar. 6, 2007.

Rosenberg et al., "Determining a Policy Output for a Communication Session," U.S. Appl. No. 11/715,032, 31 pps, 4 pps drawings, filed Mar. 6, 2007.

Leung et al., "Communicating Packets Using a Home Anchored Bearer Path," U.S. Appl. No. 11/715,033, 33 pps, 4 pps drawings, filed Mar. 6, 2007.

Andreasen et al., "Posture-Based Network Authentication," U.S. Appl. No. 11/715,040, 23 pages, 2 pps drawings, filed Mar. 6, 2007.

Iyer et al., "Access Terminal for Communicating Packets Using a Home Anchored Bearer Path," U.S. Appl. No. 11/715,041, 33 pps, 4 pps drawings, filed Mar. 6, 2007.

Rosenberg et al., "System and Method for Exchanging Policy Information in a Roaming Communications Environment," U.S. Appl. No. 11/715,056, 42 pps, 3 pps drawings, filed Mar. 6, 2007.

Rosenberg et al., "Establishing Facets of a Policy for a Communication Session," U.S. Appl. No. 11/715,065, 32 pps, 4 pps drawings, filed Mar. 6, 2007.

Rosenberg et al., "Performing Deep Packet Inspection for a Communication Session," U.S. Appl. No. 11/715,073, 31 pps, 4 pps drawings, filed Mar. 6, 2007.

Rosenberg et al., "System and Method for Providing Emergency Services in a Visited Communications Environment," U.S. Appl. No. 11/715,111, 39 pps, 2 pps drawings, filed Mar. 6, 2007.

Panda et al., "Application-Aware Policy Enforcement," U.S. Appl. No. 11/715,187, 28 pps, 2 pps drawings, filed Mar. 6, 2007.

Andreasen et al., "System and Method for Generating a Unified Accounting Record for a Communication Session," U.S. Appl. No. 11/715,210, 46 pps, 3 pps drawings, filed Mar. 6, 2007.

Andreasen et al., "Network-triggered quality of service (QoS) Reservation," U.S. Appl. No. 11/715,250, 21 pps, 2 pps drawings, filed Mar. 6, 2007.

Andreasen et al.,; "Policy-Based Control of Content Intercept", U.S. Appl. No. 11/715,251, 23 pps, 2 pps drawings.

Rosenberg et al., "System and Method for Network Charging Using Policy Peering," U.S. Appl. No. 11/715,256, 43 pps, 3 pps drawings, filed Mar. 6, 2007.

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Networks Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At SUPERCOMM; Company Demonstrates Industry First Wireless Content Usage Based Billing Solution," NND 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs. Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.

\* cited by examiner

ASSIGNING A SERVING-CSCF DURING ACCESS AUTHENTICATION

RELATED APPLICATION

This application claims priority under 35 U.S.C. 119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT," filed Mar. 6, 2006, by Flemming Andreasen et al., which is incorporated herein by reference.

TECHNICAL FIELD

This invention relates generally to the field of telecommunications and more specifically to assigning a serving-CSCF during access authentication.

BACKGROUND

The Internet Protocol (IP) Multimedia Subsystem (IMS) delivers IP multimedia services to access terminals. IMS utilizes call session control functions (CSCFs) to provide the services. CSCFs are Session Initiation Protocol (SIP) servers and proxies that process SIP signaling packets. A proxy-CSCF (P-CSCF) is a SIP proxy that is typically the first point of contact for an access terminal. A serving-CSCF (S-CSCF) is a SIP server that performs session control. The serving-CSCF operates as a home proxy for an access terminal and manages the features and communication sessions for the terminal. An interrogating-CSCF (I-CSCF) is a SIP proxy that may be used as a forwarding point for SIP packets.

A serving-CSCF is assigned to an access terminal. The incoming and outgoing sessions for the access terminal pass through the assigned serving-CSCF. Known techniques for assigning the serving-CSCF, however, may not be efficient in certain situations.

SUMMARY OF THE DISCLOSURE

In accordance with the present invention, disadvantages and problems associated with previous techniques for communicating packets may be reduced or eliminated.

According to one embodiment of the present invention, assigning a serving-call session control function (serving-CSCF) to an access terminal includes receiving an access authorization request corresponding to the access terminal. The access terminal is authorized, and a serving-CSCF is assigned to the access terminal. An access authorization response comprising the serving-CSCF address is sent.

Certain embodiments of the invention may provide one or more technical advantages. A technical advantage of one embodiment may be that a serving-CSCF may be assigned to a user of an access terminal during access authentication of the terminal. The address of the assigned serving-CSCF may be provided to the access terminal to allow the access terminal to register directly with the serving-CSCF. Accordingly, an interrogating-CSCF is not needed to assign the serving-CSCF, which may increase the efficiency of the registration process. Moreover, eliminating the interrogating-CSCF may allow for reducing the number of network elements of a network or may allow for combining network elements.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
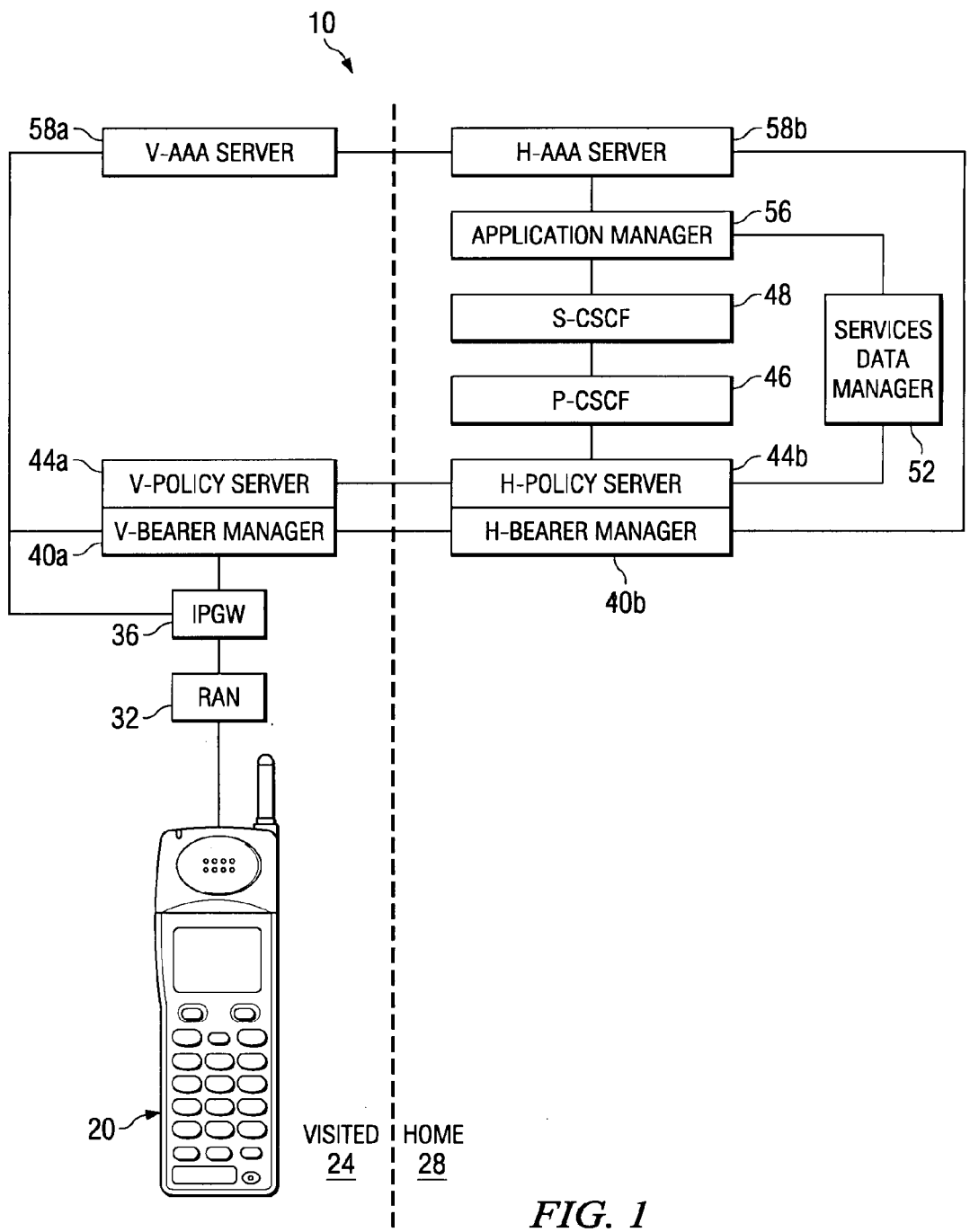
FIG. 1 illustrates one embodiment of a system that communicates packets for an access terminal.
Figure 2:
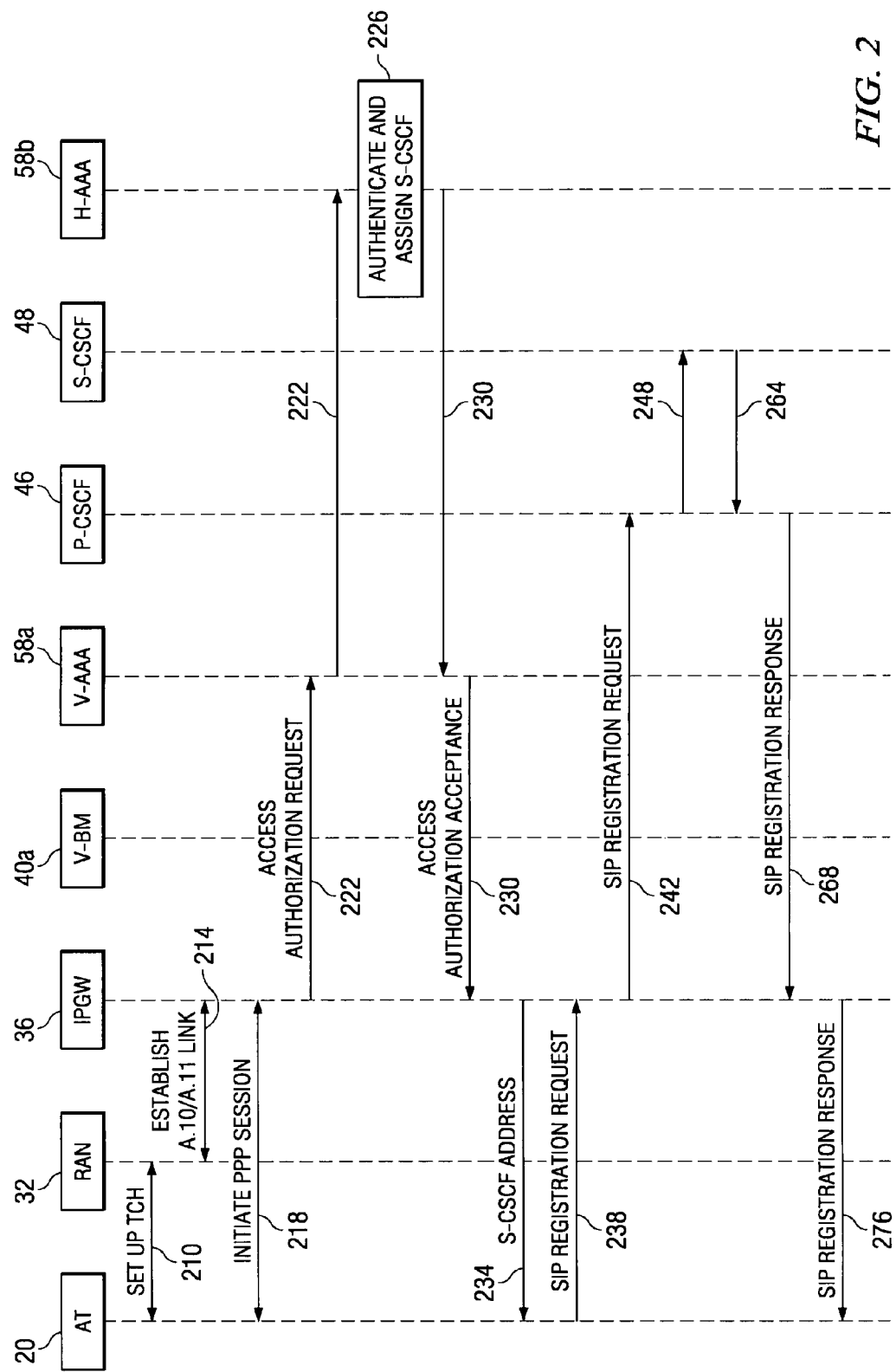
FIG. 2 illustrates one embodiment of a method for assigning a serving-CSCF that may be used by the system of FIG. 1.

Embodiments of the present invention and its advantages are best understood by referring to FIGS. 1 and 2 of the drawings, like numerals being used for like and corresponding parts of the various drawings.

FIG. 1 illustrates one embodiment of a system 10 that communicates packets for an access terminal 20. According to the embodiment, a serving-CSCF 48 may be assigned to a user of access terminal 20 during access authentication of terminal 20. The address of assigned serving-CSCF 48 may be provided to access terminal 20 to allow access terminal 20 to register with the serving-CSCF 48 through proxy-CSCF 46.

According to the illustrated embodiment, system 10 provides services such as communication sessions to endpoints such as access terminal 20. A communication session refers to an active communication between endpoints. Information may be communicated during a communication session. Information may refer to voice, data, text, audio, video, multimedia, control, signaling, other information, or any combination of any of the preceding. Information may be communicated in packets. A packet may comprise a bundle of data organized in a specific way for transmission.

System 10 may utilize communication protocols and technologies to provide the communication sessions. Examples of communication protocols and technologies include those set by the Institute of Electrical and Electronics Engineers, Inc. (IEEE) 822.xx standards, the International Telecommunications Union (ITU-T) standards, the European Telecommunications Standards Institute (ETSI) standards (for example, General Packet Radio Services (GPRS)), the Internet Engineering Task Force (IETF) standards (for example, IP such as mobile IP), or other standards.

According to the illustrated embodiment, system 10 includes access terminals 20. Access terminal 20 represents any suitable device operable to communicate with a communication network. Access terminal 20 may comprise, for example, a personal digital assistant, a computer such as a laptop, a cellular telephone, a mobile handset, or any other device operable to communicate with system 10. Access terminal 20 may support any suitable protocol, for example, simple IP and/or mobile IP.

System 10 includes communication networks such as a visited network 24 and a home network 28. In general, a communication network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In the illustrated embodiment, visited network 24 represents a communication network that facilitates a communication session for access terminal 20 within the range of visited network 24. Home network 28 represents a communication network that maintains a subscription for access terminal 20. The subscription may include an account that is charged based upon usage by access terminal 20. Visited network 24 and home network 28 may be part of the same or different communication networks.

Visited network 24 and home network 28 may include any suitable components for facilitating a communication session for access terminal 20. According to the illustrated embodiment, visited network 24 includes a radio access network (RAN) 32, an IP gateway 36, a visited bearer manager (V-BM) 40a, a visited policy server (V-PS) 44a, a visited authentication, authorization, and accounting (AAA) server (V-AAA) 58a. Home network 28 includes a home bearer manager (H-BM) 40b, a home policy server (H-PS) 44b, a proxy-CSCF 46, a serving-CSCF 48, a services data manager (SDM) 52, an application manager (AM) 56, and a home AAA server (H-AAA) 58b coupled as shown.

Radio access network 32 provides access services to access terminal 20. For example, radio access network 32 may provide layer 2 mobile access, mobility, and/or handoff services within its area of coverage.

IP gateway 36 operates as a gateway between radio access network 32 and an IP network. IP gateway 36 may perform operations such as authenticating access terminal 20, assigning a bearer manager 40 to access terminal 20, performing handoff functions between IP gateway 36 and radio access network 32, and/or facilitating registration of access terminal 20 to the IP network. In one embodiment, IP gateway 36 may comprise a packet data serving node (PDSN).

Bearer managers 40 allocate resources and provide bearer paths that communicate packets to and/or from access terminal 20. A bearer manager 40 may operate as a home or foreign agent that authorizes use of a network address that allows access terminal 20 to use a bearer path. A bearer manager 40 may comprise any suitable device, for example, a Serving General Packet Radio Services (GPRS) Support Node (SGSN), a home/foreign agent, a mobile gateway, a mobile IPv6 node, an IP telephone, or a Packet Data Serving Node (PDSN).

A bearer manager 40 may perform other suitable operations to provide services to access terminal 20. Examples of other suitable operations include processing signaling, committing resources, and maintaining gateways for access terminal 20. Other examples include enforcing network policies (such as mobility policies), providing security, detecting application layer traffic, recording network presence, and/or performing other suitable operation.

Policy servers 44 manage policy rules and provide the policy rules to bearer managers 40. In general, a policy may include rules that specify an action to be taken in particular situations. Policies may include routing, charging, quality of service, usage tracking, and/or other rules.

Proxy-CSCF 46 is a SIP proxy that is typically the first point of contact for access terminal 20. Proxy-CSCF 46 sits on a signaling path and may inspect signaling packets. Proxy-CSCF 46 may perform any suitable SIP proxy operations, such as authenticate a user, establish security associations with access terminal 20, compress and/or decompress SIP messages, and/or generate charging records. Proxy-CSCF may also include interrogating-CSCF (I-CSCF) functionality.

Serving-CSCF 48 is a SIP server that performs session control. Serving-CSCF 48 may perform any suitable SIP server operations, such as handle SIP registrations, inspect signaling messages, provide routing services, assign application manager 56, and/or enforce network policies. Serving-CSCF 48 may also include interrogating-CSCF functionality. According to one embodiment, proxy-CSCF and serving-CSCF may be located in the same or different network elements.

Services data manager (SDM) 52 stores subscriber data for access terminals 20. According to one embodiment, services data manager 52 may store policy documents that define policies. One or more subscribers may be associated with a particular policy document that defines the policies for those subscribers.

Application manager 56 manages applications, such as SIP applications and/or other suitable applications. The applications may be used to perform SIP operations (such as SIP registration, authorization, and routing), voice features (such as call routing and call forwarding), services (such as push-to-talk (PTT) and IP Centrex), Service Capabilities Interaction Management (SCIM), user presence services, and/or other operations. According to one embodiment, application manager 56 may be located in the same or different element as serving-CSCF 48.

AAA servers 58 perform authentication, authorization, and/or accounting operations. Home AAA server 58b performs these operations for access terminal 20. Visited AAA server 58a requests that home AAA server 58b performs these operations for access terminal 20 served by visited network 24. According to one embodiment, home AAA server 58b may be collocated with SDM 52.

A component of system 10 may include any suitable arrangement of elements, for example, an interface, logic, memory, other suitable element, or combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Furthermore, some elements of system may be moved from home to visited network or from visited to home network. For example, the proxy-CSCF 46 may be moved from the home to the visited network. Additionally, operations of system 10 may be performed using any suitable logic. As used in this document, "each" refers to each member of a set or each member of a subset of a set.

FIG. 2 illustrates one embodiment of a method for assigning a serving-CSCF that may be used by system 10 of FIG. 1. The method begins at step 210, where a traffic channel (TCh) is set up to authenticate access terminal 20. The traffic channel may be set up as access terminal powers up. Radio access network 32 initiates establishment of a link with IP gateway 36 at step 214. Access terminal 20 initiates a point-to-point (PPP) session with IP gateway 36 at step 218. IP gateway 36 sends an access authorization request to visited AAA server 58a at step 222, which relays the access authorization request to home AAA server 58b.

Home AAA server 58b authenticates access terminal 20 and assigns a serving-CSCF to access terminal at step 226. The serving-CSCF may be assigned in any suitable manner. For example, the serving-CSCF may be assigned according to any suitable load balancing technique, such as on the basis of the availability of the serving-CSCF. The serving-CSCF may have an address, such as an IP address. The assigned serving-CSCF may be stored at services data manager 52.

Home AAA server 58b sends an access authorization acceptance, which includes the assigned serving-CSCF address, to visited AAA server 58a at step 230. In one embodiment, the access authorization request and access authorization acceptance may conform to the Extensible Authentication Protocol (EAP). Visited AAA server 58a forwards the access authorization acceptance to IP gateway 36. IP gateway 36 may cache the assigned serving-CSCF address.

IP gateway 36 sends the assigned serving-CSCF address to access terminal 20 at step 234. IP gateway 36 may send the serving-CSCF address in any suitable manner. According to one embodiment, IP gateway 36 may send a PPP session completion message that includes the assigned serving-CSCF address. According to another embodiment, IP gateway 36 may send the serving-CSCF address as a Dynamic Host Configuration Protocol (DHCP) option code during an IP address request process. According to yet another embodiment, IP gateway 36 may send the serving-CSCF address as the contents of an Extensible Authentication Protocol (EAP) message.

Once access terminal 20 has obtained an IP address, access terminal 20 sends a SIP registration request at step 238. The registration request is directed to proxy-CSCF 46, and includes information instructing proxy-CSCF to forward the request to the assigned serving-CSCF 48. The information may be included in, for example, a SIP route header, a SIP body, or other suitable SIP field. In one embodiment, proxy-CSCF 46 and serving-CSCF 48 may be the same element, and access terminal 20 may direct the registration request to the element.

IP gateway 36 forwards the SIP registration request to proxy-CSCF 46 at step 242. In one embodiment, proxy-CSCF 46 forwards the request to serving-CSCF 48 at step 248 in accordance with the information in the registration request. In another embodiment, if proxy-CSCF 46 and serving-CSCF 48 are the same element, the request is not forwarded. In one embodiment, proxy-CSCF may invoke an interrogating-CSCF function to ensure access terminal 20 has directed the request to the correct assigned serving-CSCF 48. Serving-CSCF may register access terminal by binding the IP address of terminal 20 and the SIP address.

Serving-CSCF 48 sends a SIP registration response at step 264 to proxy-CSCF 46, which forwards the reply through IP gateway 36 at step 268. IP gateway 36 forwards the SIP registration response to access terminal 20 at step 276.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a serving-CSCF may be assigned to a user of an access terminal during access authentication of the terminal. The address of the assigned serving-CSCF may be provided to the access terminal to allow the access terminal to register with the serving-CSCF through a proxy-CSCF. Accordingly, an interrogating-CSCF is not needed to assign the serving-CSCF, which may increase the efficiency of the registration process. Moreover, eliminating the interrogating-CSCF may reduce the number of network elements of the network or may allow elements of the network to be combined.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for assigning a serving-call session control function (serving-CSCF) to an access terminal, comprising:
    receiving an access authorization request corresponding to the access terminal;
    authorizing the access terminal;
    assigning, by an authentication server, a serving-CSCF to the access terminal during access authorization and prior to receiving a registration request initiating registration, the serving-CSCF having a serving-CSCF address, the assigning performed independently of an interrogating-CSCF; and
    sending an access authorization response comprising the serving-CSCF address to the access terminal during access authorization, the serving-CSCF address included in the registration request received during registration, the registration initiated by the access terminal after the access authorization.

2. The method of claim 1, further comprising:
    receiving the registration request; and
    registering the access terminal in response to receiving the registration request.

3. The method of claim 1, further comprising:
    receiving the registration request at a proxy-CSCF and the serving-CSCF, the proxy-CSCF and the serving-CSCF at the same network element.

4. The method of claim 1, further comprising:
    receiving the registration request identifying the serving-CSCF; and
    forwarding the registration request to the identified S-CSCF.

5. The method of claim 1, wherein sending the access authorization response further comprises:
    sending a point-to-point (PPP) session completion message comprising the assigned serving-CSCF address.

6. The method of claim 1, wherein sending the access authorization response further comprises:
    sending the serving-CSCF address as a Dynamic Host Configuration Protocol (DHCP) option code during an IP address request process.

7. The method of claim 1, wherein sending the access authorization response further comprises:
    sending an Extensible Authentication Protocol (EAP) message comprising the serving-CSCF address.

8. The method of claim 1, further comprising:
    verifying that the registration request has reached the serving-CSCF.

9. An authentication server for assigning a serving-call session control function (serving-CSCF) to an access terminal, comprising:
- a memory operable to store information about the access terminal; and
- a processor in communication with the memory and operable to:
  - receive an access authorization request corresponding to the access terminal;
  - authorize the access terminal;
  - assign a serving-CSCF to the access terminal during access authorization and prior to receiving a registration request initiating registration, the serving-CSCF having a serving-CSCF address, the assigning performed independently of an interrogating-CSCF; and
  - send an access authorization response comprising the serving-CSCF address to the access terminal during access authorization, the serving-CSCF address included in the registration request received during registration, the registration initiated by the access terminal after the access authorization.

10. The server of claim 9, the processor further operable to:
receive the registration request; and
register the access terminal in response to receiving the registration request.

11. The server of claim 9, the processor further operable to:
receive the registration request at a proxy-CSCF and the serving-CSCF, the proxy-CSCF and the serving-CSCF at the same network element.

12. The server of claim 9, the processor further operable to:
receive the registration request identifying the serving-CSCF; and
forward the registration request to the identified S-CSCF.

13. The server of claim 9, the processor further operable to send the access authorization response by:
sending a point-to-point (PPP) session completion message comprising the assigned serving-CSCF address.

14. The server of claim 9, the processor further operable to send the access authorization response by:
sending the serving-CSCF address as a Dynamic Host Configuration Protocol (DHCP) option code during an IP address request process.

15. The server of claim 9, the processor further operable to send the access authorization response by:
sending an Extensible Authentication Protocol (EAP) message comprising the serving-CSCF address.

16. The server of claim 9, the processor further operable to:
verify that the registration request has reached the serving-CSCF.

17. A non-transitory computer-readable storage medium storing logic for assigning a serving-call session control function (serving-CSCF) to an access terminal, the logic operable to:
- receive an access authorization request corresponding to the access terminal;
- authorize the access terminal;
- assign, by an authentication server, a serving-CSCF to the access terminal during access authorization and prior to receiving a registration request initiating registration, the serving-CSCF having a serving-CSCF address, the assigning performed independently of an interrogating-CSCF; and
- send an access authorization response comprising the serving-CSCF address to the access terminal during access authorization, the serving-CSCF address included in the registration request received during registration, the registration initiated by the access terminal after the access authorization.

18. The computer-readable storage medium of claim 17, further operable to:
receive the registration request; and
register the access terminal in response to receiving the registration request.

19. The computer-readable storage medium of claim 17, further operable to:
receive the registration request at a proxy-CSCF and the serving-CSCF, the proxy-CSCF and the serving-CSCF at the same network element.

20. The computer-readable storage medium of claim 17, further operable to:
receive the registration request identifying the serving-CSCF; and
forward the registration request to the identified S-CSCF.

21. The computer-readable storage medium of claim 17, further operable to send the access authorization response by:
sending a point-to-point (PPP) session completion message comprising the assigned serving-CSCF address.

22. The computer-readable storage medium of claim 17, further operable to send the access authorization response by:
sending the serving-CSCF address as a Dynamic Host Configuration Protocol (DHCP) option code during an IP address request process.

23. The computer-readable storage medium of claim 17, further operable to send the access authorization response by:
sending an Extensible Authentication Protocol (EAP) message comprising the serving-CSCF address.

24. The computer-readable storage medium of claim 17, further operable to:
verify that the registration request has reached the serving-CSCF.

25. A system for assigning a serving-call session control function (serving-CSCF) to an access terminal, comprising:
- means for receiving an access authorization request corresponding to the access terminal;
- means for authorizing the access terminal;
- means for assigning, by an authentication server, a serving-CSCF to the access terminal during access authorization and prior to receiving a registration request initiating registration, the serving-CSCF having a serving-CSCF address, the assigning performed independently of an interrogating-CSCF; and
- means for sending an access authorization response comprising the serving-CSCF address to the access terminal during access authorization, the serving-CSCF address included in the registration request received during registration, the registration initiated by the access terminal after the access authorization.

* * * * *